United States Patent [19]

Mann et al.

[11] Patent Number: 5,473,876
[45] Date of Patent: Dec. 12, 1995

[54] VIBRATION-DAMPED BELT-BIASING SYSTEM FOR TEXTILE ROLLER

[75] Inventors: Peter Mann, Süssen; Armin Koch, Uhingen-Sparwiesen; Detlef Buschlüter, Göppingen-Faurndau, all of Germany

[73] Assignee: Zinser Textilmaschinen GmbH, Ebersbach/Fils, Germany

[21] Appl. No.: 227,608

[22] Filed: Apr. 14, 1994

[30] Foreign Application Priority Data

May 14, 1993 [DE] Germany ............... 43 16 162.6

[51] Int. Cl.⁶ ............................................. D01H 1/241
[52] U.S. Cl. ............................................. 57/105
[58] Field of Search ............................. 57/104, 105

[56] References Cited

U.S. PATENT DOCUMENTS

| 2,476,367 | 7/1949 | Guernsey. | |
|---|---|---|---|
| 4,193,254 | 3/1980 | Fusaroli | 57/105 |
| 4,372,106 | 2/1983 | Oberstrass | 57/105 |

FOREIGN PATENT DOCUMENTS

| 1112363 | 2/1962 | Germany. | |
|---|---|---|---|
| 1942390 | 7/1966 | Germany. | |
| 1969001 | 9/1967 | Germany. | |
| 1266088 | 4/1968 | Germany. | |
| 1947203 | 8/1972 | Germany. | |
| 2230765 | 10/1974 | Germany. | |
| 2428851 | 1/1976 | Germany | 57/105 |
| 2851326 | 6/1979 | Germany. | |
| 3106307 | 9/1982 | Germany | 57/105 |
| 3828719 | 3/1989 | Germany. | |
| 3940047 | 6/1990 | Germany. | |
| 3939593 | 6/1991 | Germany. | |
| 60-22089 | 5/1985 | Japan | 57/105 |
| 519032 | 3/1972 | Switzerland | 57/105 |

OTHER PUBLICATIONS

"Vibra–Stop System" literature Sep. 1975 In-house literature of Suessen.

Primary Examiner—Joseph L. Hail, III
Attorney, Agent, or Firm—Herbert Dubno; Andrew Wilford

[57] ABSTRACT

A drive system has a fixed support, a textile spindle having a whorl and rotatable adjacent the support about a spindle axis, a continuously advancing drive belt tangentially engaging the whorl, and an elongated leaf spring extending generally parallel to the belt and having a portion fixed to the support and an outer end carrying a roller bearing toward the whorl on the belt. The spring is tensioned to press the roller against the belt and the belt against the whorl. A dimensionally stable plate extends generally parallel to the leaf spring, spaced along at least most of its length from the leaf spring. A layer of energy-absorbing material is provided between and bonded to the plate and spring along all of a region extending from the support to the roller so that as the spring and plate bend the layer is subjected to shear.

9 Claims, 2 Drawing Sheets

VIBRATION-DAMPED BELT-BIASING SYSTEM FOR TEXTILE ROLLER

FIELD OF THE INVENTION

The present invention relates to a tangential-belt drive of a textile-processing spindle. More particularly this invention concerns a system for reducing vibration in such a drive.

BACKGROUND OF THE INVENTION

A pusher-roller system presses a tangential drive belt on the drive whorls of textile spindles by means of a solidly mounted leaf spring on at least one end of which the pusher roller is freely rotatable. Such a spring is frequently provided with a vibration-damping device since this type of system is vibrated by the rapidly moving tangential belt so that it does not press well and generates harmful noise.

German patent documents 1,969,001, 3,232,593, and 3,939,593 describe systems wherein vibration dampers are mounted on the pusher-roller holders. These parts are fairly expensive and affect the spring characteristic of the pusher-roller system.

Known frictional dampers as described in German patent documents 1,942,390, 1,947,203, 1,969,001, and 2,230,765 have friction pads. These systems have the disadvantage that they are subject to friction and wear so that with time the damping effect lessens or at least changes unforeseeably.

Coating the bearing regions of the springs carrying the pusher rollers with elastic material is described in German patent document 2,230,786. This makes it impossible to solidly mount these leaf springs and can lead to unwanted displacement of these leaf springs and of the pusher rollers.

It has also been suggested in German patent documents 2,351,326 and 3,828,719 to fill the gap between two leaf springs forming a spring parallelogram with a body. Such arrangements provide some minimal damping at the outer ends of the biasing spring, but do not sufficiently suppress vibration.

None of the known systems is simple and also effective. The effective systems are complex and expensive and the simple systems do not work well.

SUMMARY OF THE INVENTION

A drive system according to the invention has a fixed support, a textile spindle having a whorl and rotatable adjacent the support about a spindle axis, a continuously advancing drive belt tangentially engaging the whorl, and an elongated leaf spring extending generally parallel to the belt and having a portion fixed to the support and an outer end carrying a roller bearing toward the whorl on the belt. The spring is tensioned to press the roller against the belt and the belt against the whorl. According to the invention a dimensionally stable plate extends generally parallel to the leaf spring, spaced along at least most of its length from the leaf spring. A layer of energy-absorbing material is provided between and bonded to the plate and spring along all of a region extending from the support to the roller so that as the spring and plate bend the layer is subjected to shear.

This arrangement therefore effectively damps vibration while not interfering with how the leaf spring biases the roller against the belt. The shear forces in the energy-absorbing layer effectively dissipate energy to completely eliminate vibration. The energy-absorbing material serves as it is deformed by bending of the leaf spring to absorb a great deal of energy. This is done optimally by a purely plastic deformation without a return force. The return to the starting position is the job of the leaf spring. Since the material layer should retain its starting dimensions with respect to width, thickness, and length, the material should as much as possible have an elastic component to return it when no longer stressed to its original shape. The chemistry of elastomers has a number of such materials with these characteristics. Even rubber with its relatively high elasticity has shown itself very advantageous for the desired purpose.

A particularly effective shear effect with respect to energy dissipation of the layer of energy-absorbing material and thus a high energy absorption in a relatively thin layer of this material is obtained according to the invention in that as a result of the dimensional stability both of the leaf spring as well as of the additional plate when the system is bent there is a parallel shifting of the leaf spring and plate relative to each other which subjects the flat energy-absorbing layer bonded solidly with both the leaf spring and with the plate to a broad-surface shear deformation. This shear deformation apparently absorbs so much energy that it is no longer available for return movement of the system and thus vibrations are damped with remarkable speed and efficiency.

In order to fulfill its function according to the invention the additional plate need only be dimensionally stable in the longitudinal direction of the leaf spring, that is neither stretchable nor compressible to conform closely to the various bendings of the leaf spring. These characteristics are optimally obtained by a metal plate which can also simultaneously be formed as a secondary leaf spring. In order not to change the spring force of the optimally constructed pusher-roller system, the main leaf spring is made somewhat weaker.

The damping effect of the layer of energy-absorbing material can be influenced through the selection of the hardness and the thickness of the layer and can be set for particular vibration amplitudes and frequencies of a pusher-roller system. It has been proven that harder materials and thicker material layers increase the damping effect.

It has been determined that the decay time of a pusher-roller system with damping according to the invention can be reduced by a factor of at least ten.

According to the invention the layer is between 0.5 mm and 5 mm thick. Layers of glue can secure the layer to the plate and spring or it can be vulcanized to the plate and spring. Rubber with a Shore A hardness of between 50 and 85 is usable.

The energy-absorbing layer is interrupted at the support. This allows it to be mounted solidly.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
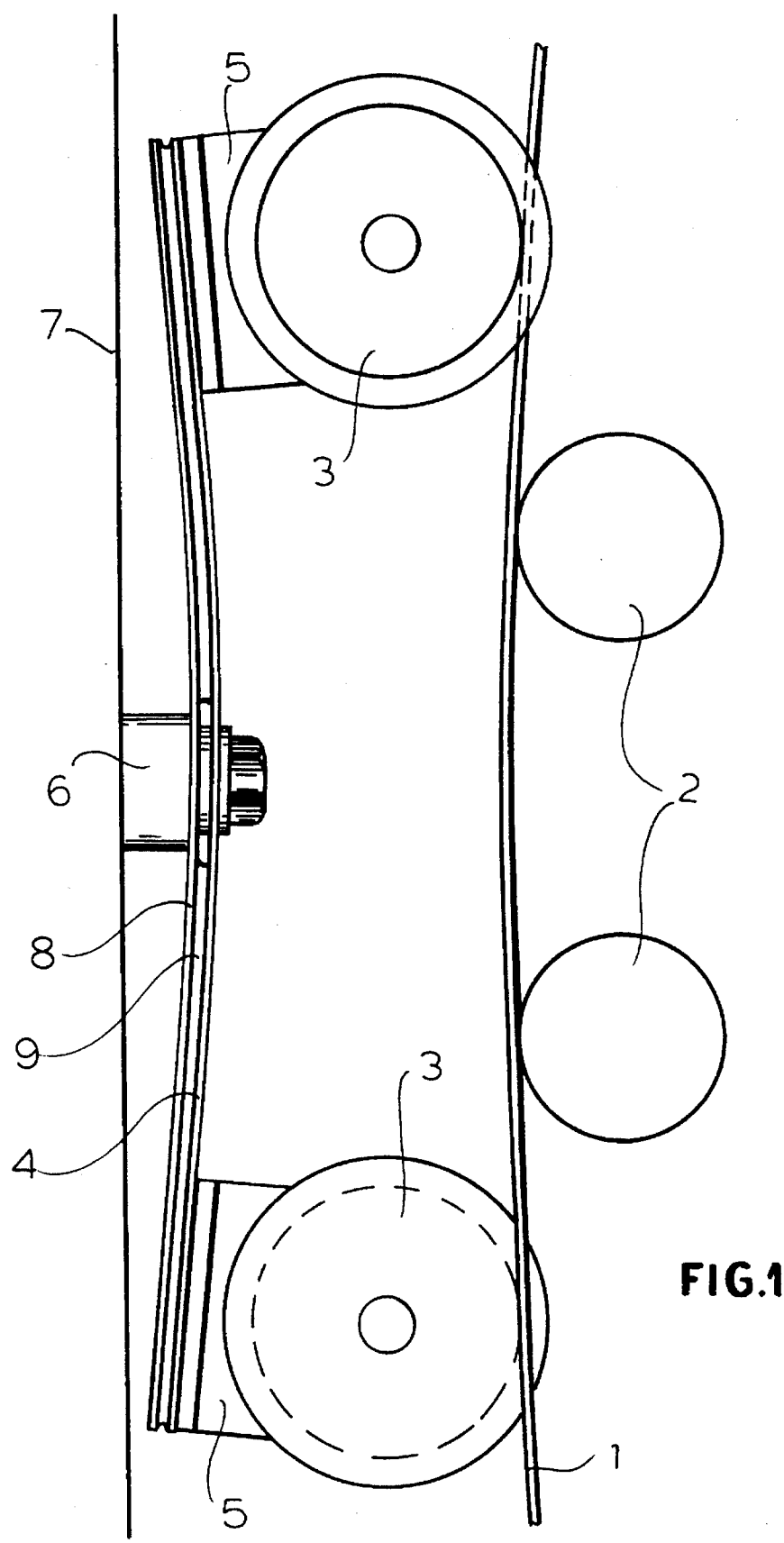
FIG. 1 is a largely schematic top view of the drive system of this invention.

As seen in FIG. 1 two whorls 2 of a row of spindles of a ring-spinning machine are driven by a tangential belt 1. In order to ensure the necessary entrainment, a tangential belt 1 is pressed toward the whorls elastically between each pair of whorls 2 by pushing rollers 3. The pressing is effected by means of a leaf spring 4 on whose ends are arranged roller carriers 5 rotatably supporting pusher rollers 3 and which is supported in its middle via a support block 6 on the machine frame 7.

According to the invention a dimensionally stable plate 8 extends parallel to the leaf spring 4 on its side as seen in FIG. 1 turned away from the spindles and is also fixed to the support block 6. A layer 9 of an energy-absorbing material is provided between the leaf spring 4 and the plate 8 and is connected over its entire surface area both to the leaf spring 4 and to the plate 8. This solid connection can be done by gluing or vulcanizing. The energy-absorbing material can advantageously be rubber.

On forward and rearward movement of the leaf spring 4 the plate 8 is moved forward and backward. As a result of the dimensional stability of both the leaf spring 4 and plate 8 there is a parallel shifting between these two parts which subjects the layer 9 to a substantial shear deformation over its entire surface.

Figure 3:
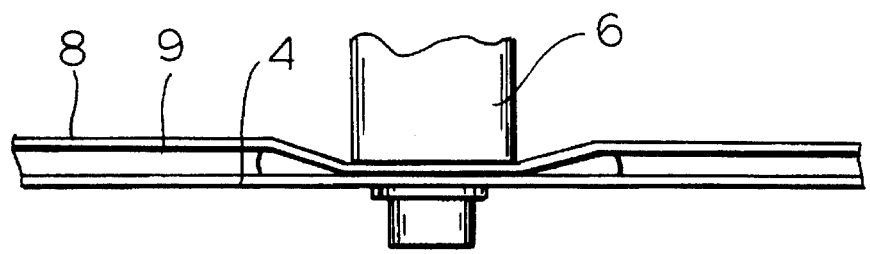
FIGS. 2 through 6 are top-view details of various embodiments of the system of this invention.
Figure 2:
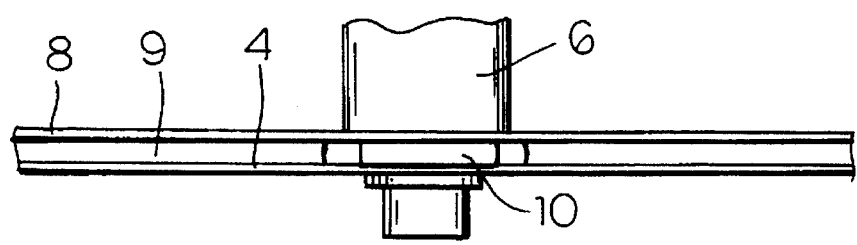

Since the pusher-roller system is very solidly screwed to the support block 6 and there is a danger that the rubber layer 9 is thus crushed, this rubber layer 9 is interrupted or left out in the region of this support block 6 and according to FIG. 2 is replaced by a solid intermediate layer 10. In the embodiment of FIG. 3 the plate 8 is bent so that the leaf spring 4 and the plate 8 lie directly against each other in the region of the support block 6. The leaf spring 4 can be similarly bent.

Figure 4:
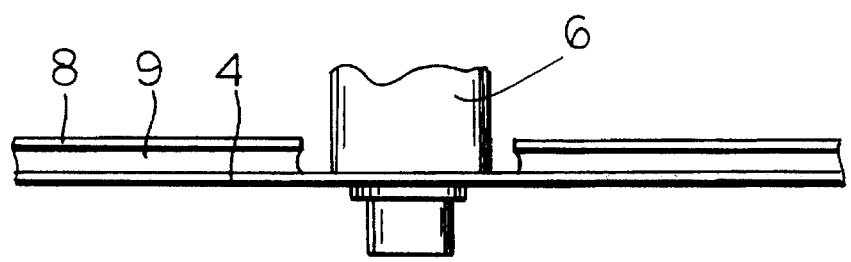
Figure 5:
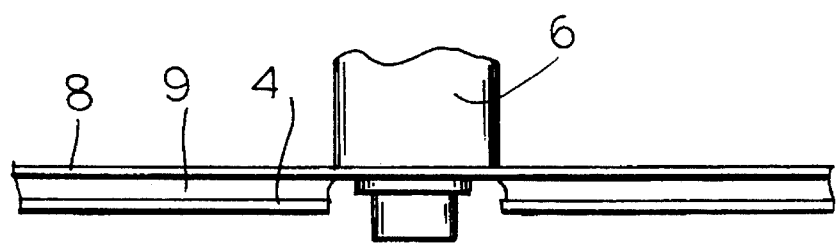

According to FIG. 4 the plate 4 is interrupted in the region of the support block 6, in FIG. 5 oppositely the leaf spring 4. This embodiment has the advantage that the transmission of sound is hindered from the pusher-roller supports to the machine frame since the support is wholly through the rubber layer 9.

Figure 6:
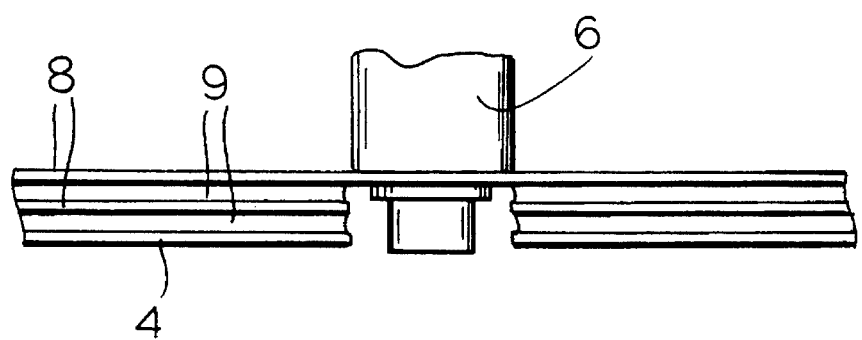

FIG. 6 shows an arrangement with two plates 4 and two layers 9 of energy-absorbing material. The attachment systems of FIGS. 2 to 5 are also usable with this embodiment.

We claim:

1. A drive system having a fixed support;

a textile spindle having a whorl and rotatable adjacent the support about a spindle axis;

a continuously advancing drive belt tangentially engaging the whorl;

an elongated leaf spring extending generally parallel to the belt and having a portion fixed to the support and an outer end;

a roller carried on the outer end and bearing toward the whorl on the belt, the spring being tensioned to press the roller against the belt and the belt against the whorl;

a dimensionally stable plate extending generally parallel to the leaf spring and spaced along at least most of its length from the leaf spring; and a layer of energy-absorbing material between and bonded to the plate and spring along all of a region extending from the support to the roller, whereby as the spring and plate bend the layer is subjected to shear.

2. The drive system defined in claim 1 wherein the layer is between 0.5 mm and 5 mm thick.

3. The drive system defined in claim 1, further comprising layers of glue securing the layer to the plate and spring.

4. The drive system defined in claim 1 wherein the layer is vulcanized to the plate and spring.

5. The drive system defined in claim 1 wherein the layer is made of rubber.

6. The drive system defined in claim 5 wherein the layer has a Shore A hardness of between 50 and 85.

7. The drive system defined in claim 1 wherein the plate is also a leaf spring.

8. The drive system defined in claim 1 wherein the layer is interrupted at the support.

9. The drive system defined in claim 1 wherein the leaf spring has two such outer ends each provided with a respective one of the rollers and the plate extends to both the outer ends, two such layers extending from the support to the respective outer ends.

\* \* \* \* \*